US011989565B2

(12) United States Patent
Widjaja Yu et al.

(10) Patent No.: US 11,989,565 B2
(45) Date of Patent: May 21, 2024

(54) SYSTEM AND METHOD TO PROVIDE A SINGLE DEVICE TYPE IN CUSTOMIZED PRODUCTS

(71) Applicant: Dell Products L.P., Round Rock, TX (US)

(72) Inventors: Frank Widjaja Yu, Austin, TX (US); Gregory M. Allen, Layton, UT (US)

(73) Assignee: Dell Products L.P., Round Rock, TX (US)

( * ) Notice: Subject to any disclaimer, the term of this patent is extended or adjusted under 35 U.S.C. 154(b) by 50 days.

(21) Appl. No.: 17/580,766

(22) Filed: Jan. 21, 2022

(65) Prior Publication Data

US 2023/0236840 A1   Jul. 27, 2023

(51) Int. Cl.
*G06F 9/44*    (2018.01)
*G06F 9/4401*  (2018.01)
*G06F 9/445*   (2018.01)

(52) U.S. Cl.
CPC ........ *G06F 9/4411* (2013.01); *G06F 9/44505* (2013.01)

(58) Field of Classification Search
CPC .............................. G06F 9/4411; G06F 9/44505
See application file for complete search history.

(56) References Cited

U.S. PATENT DOCUMENTS

| | | | |
|---|---|---|---|
| 9,792,440 B1 | 10/2017 | Wang | |
| 10,796,500 B2 | 10/2020 | Sandhu et al. | |
| 2017/0220404 A1* | 8/2017 | Polar Seminario | G06F 11/0751 |
| 2021/0279068 A1* | 9/2021 | Takanashi | G06F 9/4406 |
| 2022/0113960 A1* | 4/2022 | Moran | G06F 8/658 |

\* cited by examiner

*Primary Examiner* — Zahid Choudhury
(74) *Attorney, Agent, or Firm* — Larson Newman, LLP (57) ABSTRACT

A device including first firmware of a first type and second firmware of a second type different from the first type. The first firmware configures the device to be installed into a first information handling system associated with the first type. The second firmware configures the device to be installed into a second information handling system associated with the second type. The device is configured to receive a firmware commit command that command includes either a first indication to commit the first firmware, or a second indication to commit the second firmware, but not both indications. The device further determines that the firmware commit command includes the first indication and locks the device to use the first firmware and not the second firmware, and determines that the firmware commit command includes the second indication and locks the device to use the second firmware and not the first firmware.

20 Claims, 6 Drawing Sheets

SYSTEM AND METHOD TO PROVIDE A SINGLE DEVICE TYPE IN CUSTOMIZED PRODUCTS

FIELD OF THE DISCLOSURE

This disclosure generally relates to manufacturing information handling systems, and more particularly relates to providing a single device type in customized products.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A device may include first firmware of a first type and second firmware of a second type different from the first type. The first firmware may configure the device to be installed into a first information handling system associated with the first type. The second firmware may configure the device to be installed into a second information handling system associated with the second type. The device may be configured to receive a firmware commit command that command includes either a first indication to commit the first firmware, or a second indication to commit the second firmware, but not both indications. The device may further determine that the firmware commit command includes the first indication and locks the device to use the first firmware and not the second firmware, and determine that the firmware commit command includes the second indication and locks the device to use the second firmware and not the first firmware.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
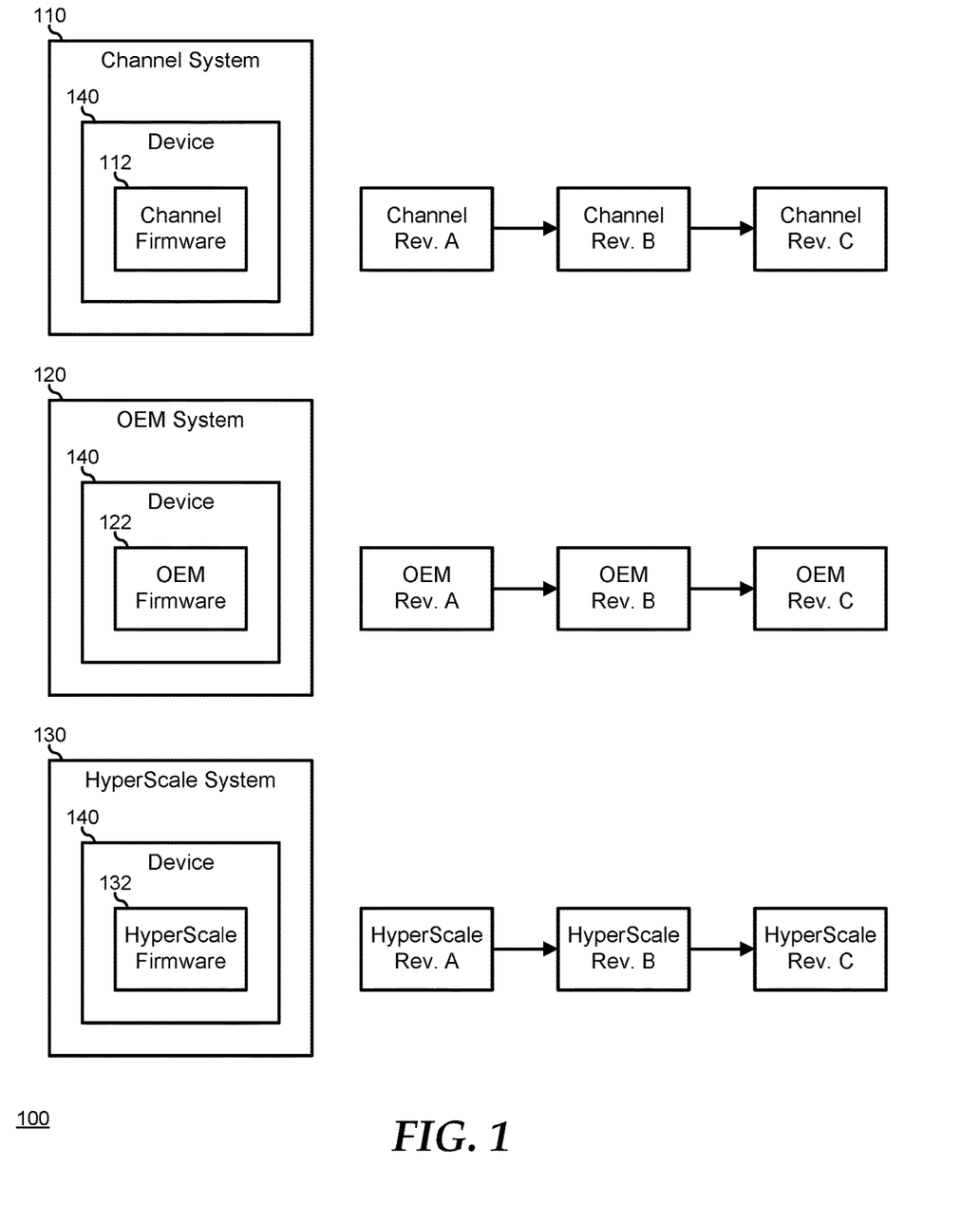
FIG. 1 is a block diagram illustrating multiple information handling systems that each utilize a common device but with different firmware according to an embodiment of the current disclosure.

FIG. 1 illustrates a product line 100 of information handling systems 110, 120, and 130. Product line 100 may be understood to represent information handling systems offered by a single manufacturer of information handling systems, by a contract assembler of information handling systems that are offered as various branded products, or another producer of information handling systems, as needed or desired. Information handling systems 110, 120, and 130 represent processing systems that can be utilized in any type of application as needed or desired, an may include mobile devices such as smartphones, tablets, and the like, personal computers such as desktop computers, laptop computers, and the like, client computers such as remote terminals, thin clients, workstations, and the like, server systems such as stand-alone servers, rack- or blade-systems, and the like, data center equipment such as switches, routers, storage servers, and the like, or other types of processing systems as needed or desired.

Information handling systems 110, 120, and 130 are characterized by the fact that each information handling system includes one or more of a common device type 140. In this regard, information handling systems 110, 120, and 130 may be understood to be of a common type of information handling system, or of different types of information handling systems as needed or desired. In a particular embodiment, information handling systems 110, 120, and 130 may be understood to be of a common type, such as a datacenter processing system. Here, product line 100 is illustrated as including a channel system (information handling system 110), an OEM system (information handling system 120), and a hyperscale system (information handling system 130).

In the illustrated embodiment, a manufacturer of product line 100 may offer information handling systems as a stand-alone product for broad distribution to a marketing channel, hence a "channel system." In this case, the channel system may be provided with a basic feature set for device 140 that is defined in part by the functionality incorporated into a channel firmware 112 that is installed into a non-volatile memory of the device. The manufacturer may further offer information handling systems that are branded as being from the manufacturer, hence an "OEM system," that is offered in conjunction with other similarly branded information handling systems. Here, the OEM system may be provided with an enhanced feature set for device 140 that is defined in part by the functionality incorporated into an OEM firmware 122 that is installed into a non-volatile memory of the device. Finally, the manufacturer may offer information handling systems that are customized to the needs of a particular customer, such as a hyperscale customer (for example Amazon, Google, etc.), hence a "hyperscale system." Here, the hyperscale system may be provided with a customized feature set for device 140 that is defined in part by the functionality incorporated into a hyperscale firmware 132 that is installed into a non-volatile memory of the device.

Device 140 represents a processing device that is includable within an information handling system, and which may be distinguished from otherwise identical devices by the firmware that is stored thereon, and by which the device derives at least a part of its operational features. Device 140 may be assembled as a part of a printed circuit board of the associated information handling system, or may be installed into an expansion slot or connector of the associated information handling system. An example of device 140 may include a memory storage device, such as a Dual Inline Memory Module (DIMM), a solid-state drive (SSD) device, a non-volatile DIMM (nvDIMM), or the like, a network device, such as a network interface card (NIC), a host bus adapter (HBA), or the like, a storage controller, such as a RAID controller, a FibreChannel controller, or the like, a co-processor device, such as a graphics processing unit (GPU) or the like, a programmable array device such as a Field Programmable Gate Array (FPGA) device or the like, an audio device, such as a sound card or the like, a management device, such as a Baseboard Management Controller (BMC), an Embedded Controller, or the like, or any other type of device that is includable with an information handling system and which may include firmware stored thereon.

While device 140 is common to each of information handling systems 110, 120, and 130, the usage of the device in each respective information handling system is defined in part by the associated channel firmware 112, OEM firmware 122, and hyperscale firmware 132. In particular, once device 140 is provided in a particular information handling system, it will be understood that the device is relegated to use only in the same type of system, and the device as found in a first type of information handling system, for example, information handling system 110, will not be cross compatible with the other types of information handling systems, for example information handling systems 120 and 130. More particularly, once a particular type of firmware, for example, channel firmware 112 is installed into a particular device 140, that particular device can not accept firmware upgrades for different types of firmware, for example for OEM firmware or hyperscale firmware.

As such, device 140 is further characterized by the fact that the manufacturer of the device will have included functions and features to detect a current type of firmware that is installed thereon, and to subsequently permit only firmware updates of the same type of firmware, and further to prevent firmware updates with different types of firmware. In this way, the manufacturer of device 140 may provide a particular functionality for bulk sale (for example, for a sales channel), and may provide customized functionality for OEMs and hyperscale customers. As such, each firmware type is illustrated as having an isolated firmware update path that is not available to devices that are installed with the other types of firmware.

The use of common devices 140 in information handling systems 110, 120, and 130, and differentiating the usage of the devices by the installation of respective channel firmware 112, OEM firmware 122, and hyperscale firmware 132 provides the manufacturer of product line 100 with advantages in terms of product differentiation, time-to-market of new products, and the flexibility to utilize known devices with well understood service histories across a wide range of products. Further, the manufacturer of device 140 gains a wider market and customer base for the device. However, the benefits described above of differentiating usage with various firmware versions are somewhat offset by the fact that both at the device manufacturer, and the product line manufacturer, inventories must be maintained of each firmware version, even though the underlying hardware device is identical, leading to challenges in production workflows and planning.

For example, the manufacturer of product line 100 must maintain three separate inventory items, one for device 140 with channel firmware 112, another for the device with OEM firmware 122, and a third for the device with hyperscale firmware 132. Further, shortages in inventory of one flavor of device 140 may not be satisfied by overstocks of the other flavors because, once the device manufacturer ships a particular flavor, the device is prevented from installing firmware images for another flavor. The details of maintaining a firmware flavor on a hardware device to the exclusion of other firmware flavors are known in the art, and will not be further described herein, except as needed to illustrate the current embodiments.

As used herein firmware as typified by channel firmware 112, OEM firmware 122, and hyperscale firmware 132 may be understood to represent code, data, settings, or the like that are stored in a non-volatile memory of the associated device. For example, such firmware may include code, data, settings, or the like that are provide on the device to direct the internal operations of the device itself, such as micro-instructions which dictate how the device itself operates in response to commands received from a host system of the information handling system into which the device is installed. In this regard, the different types of firmware may be understood to provide that the device executes a particular command in a particular fashion under the operation of a first firmware type, and to provide that the device executes the particular command in a different fashion under the operation of a second firmware type.

In another example, such firmware code may include code, data, settings, or the like that are provided by the device to the host system of the information handling system into which the device is installed. Thus the firmware may represent a firmware ROM that provides the host system with a driver, a utility, a program, or the like, through which the host system accesses the functions and features of the device. Here, the different types of firmware may be understood to provide that the device executes one set of commands under the operation of a first firmware type, and to provide that the device executes a different set of commands, typically a super-set of commands, under the operation of a second firmware type. In this case, the second firmware type would further be understood to include code, data, settings, or the like that unlock the device to perform the super-set functions or features. Further, the firmware code may include both code, data, settings, or the like for the internal operations of the device, and code, data, settings, or the like to be provided to the host system.

Figure 2:
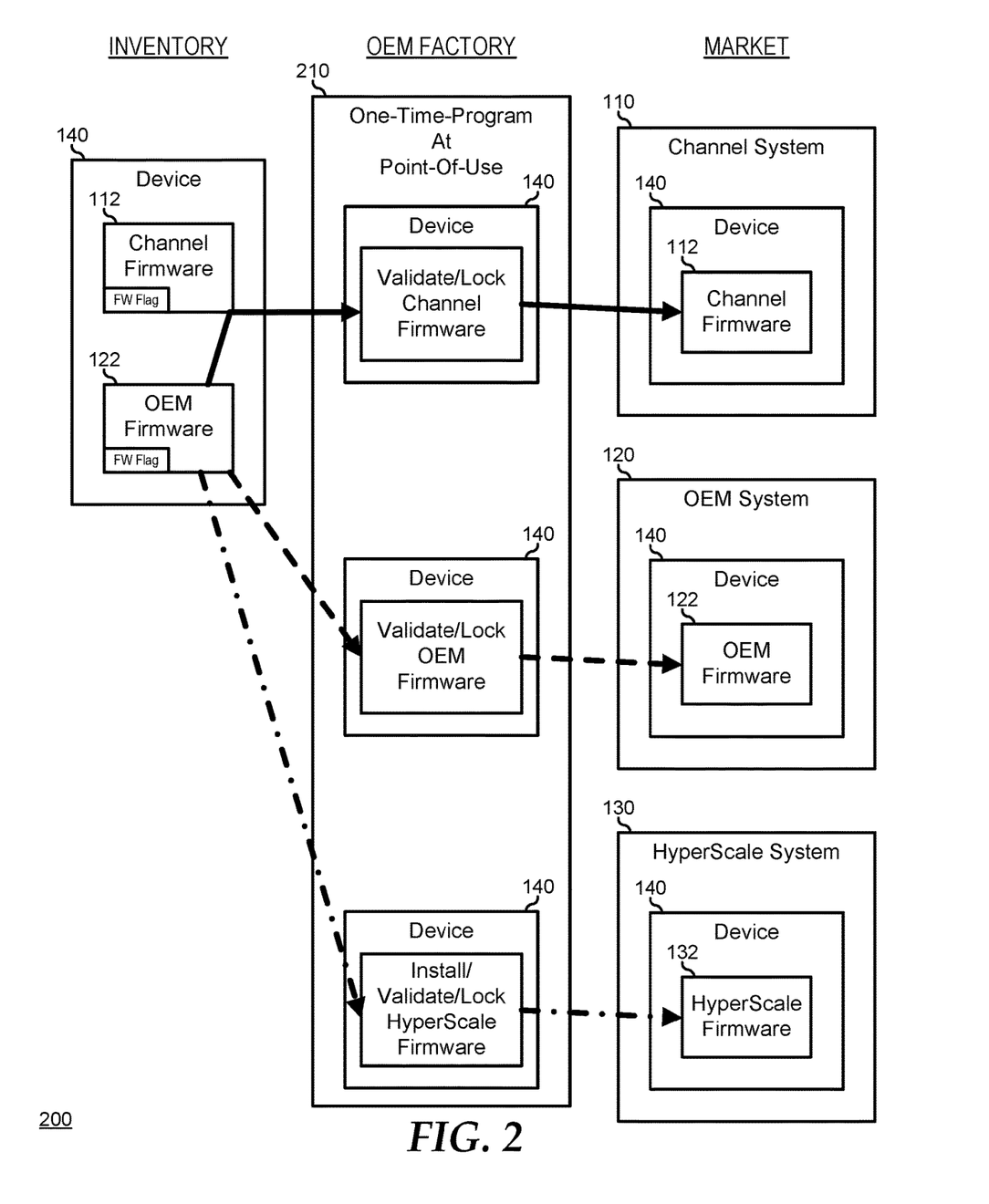
FIG. 2 is an illustration of a manufacturing flow that is utilized in providing a single device type in multiple information handling systems according to an embodiment of the current disclosure.

FIG. 2 illustrates a manufacturing flow 200 for product line 100, including an inventory of devices 140 that are each submitted to a one-time-programmable (OTP) point-of-use (POU) process 210 that operates to configure the devices to include channel firmware 112 for channel system 110, to include OEM firmware 122 for OEM system 120, or to include hyperscale firmware 132 for hyperscale system 130, as needed at the point of manufacture. Here, the manufacturer of product line 100 gains the flexibility to inventory a single item (device 140) with a dual firmware images, here illustrated as channel firmware 112 and OEM firmware 122.

Here, device 140 stores channel firmware 112 and OEM firmware 122 in a non-volatile memory of the device. Each of channel firmware 112 and OEM firmware 122 include a flag that configures device 140 to operate based upon one or the other of the channel firmware or the OEM firmware. That is, when the flag for channel firmware 112 is set, device 140 initializes and operates under the channel firmware, and when the flag for OEM firmware 122 is set, the device initializes and operates under the OEM firmware. In this way, the manufacturer of device 140 can maintain fewer inventory items and can configure one of the flags as needed based upon orders from channel customers or from OEM customers. Then, when the manufacturer of product line 100 receives devices 140, the flag for OEM firmware 122 is set, meaning that the manufacturer of the product line may similarly maintain a single inventory item and can configure the devices as needed to populate channel system 110, OEM system 120, or hyperscale system 130, as the demand dictates. At this stage in the production, the settings of the flags associated with channel firmware 112 and OEM firmware 122 may be understood to be temporarily set, as described further below.

In particular, when device 140 is to be populated into channel system 110, the device is submitted to OTP POU 210 and OEM firmware 122 is initialized. However, OEM firmware 122 operates to validate channel firmware 112 and to lock the channel firmware for future operation by permanently setting the flag for the channel firmware. In this way, a particular instance of device 140 that is to be utilized for channel system 110 is permanently locked to the channel firmware update path, and can not be updated with any other type of firmware. Similarly, when device 140 is to be populated into OEM system 120, the device is submitted to OTP POU 210 and OEM firmware 122 is initialized. Here, OEM firmware 122 operates to validate OEM firmware 122 and to lock the OEM firmware for future operation by permanently setting the flag for the channel firmware.

In this way, a particular instance of device 140 that is to be utilized for OEM system 120 is permanently locked to the OEM firmware update path, and can not be updated with any other type of firmware. Finally, when device 140 is to be populated into hyperscale system 130, the device is submitted to OTP POU 210 and OEM firmware 122 is initialized. However, OEM firmware 122 here operates to install hyperscale firmware 132 and to validate the hyperscale firmware prior to locking the hyperscale firmware for future operation by setting the flag for the hyperscale firmware. In this way, a particular instance of device 140 that is to be utilized for hyperscale system 130 is permanently locked to the hyperscale firmware update path, and can not be updated with any other type of firmware. In the case of hyperscale firmware 132, OEM firmware 122 may operate to install the hyperscale firmware by any method as may be known in the art. For example, hyperscale firmware 132 may be downloaded from an update server and installed over either installation of channel firmware 112 or the installation of OEM firmware 122, as needed or desired.

OTP POU 210 may be understood to be an operation that is performed on devices 140 to render them permanently into one type or another (for example channel firmware 112, OEM firmware 122, or hyperscale firmware 132) as demand dictates. However, the operation of OTP POU 210 need not be a separate activity from powering on and initializing the associated system (for example channel system 110, OEM system 120, or hyperscale system 130). In other words, OTP POU 210 may be understood to be a separate procedure that is performed on devices 140 prior to installation into the associated systems, or may be understood to be performed after installation into the associated systems. In the later case, a first boot procedure of the associated systems may include the process steps of OTP POU 210, as described herein. The flag associated with the various firmware images are depicted as residing in the associated firmware images, but this is not necessarily so, and a single flag bit or flag field instantiated in a non-volatile memory of device 140 may serve to indicate which one of two or more firmware images are to be enabled and run on the device, as needed or desired.

In either case, OTP POU 210 may be understood to represent a combination of hardware functionality designed into device 140 that permits the one-time selection of a particular firmware image and the subsequent locking out of other types of firmware updates, and firmware functionality programmed into the OEM firmware image that permits the device to receive special OTP commands that direct the device to select the particular firmware image and to lock that image type for the future.

Figure 3:
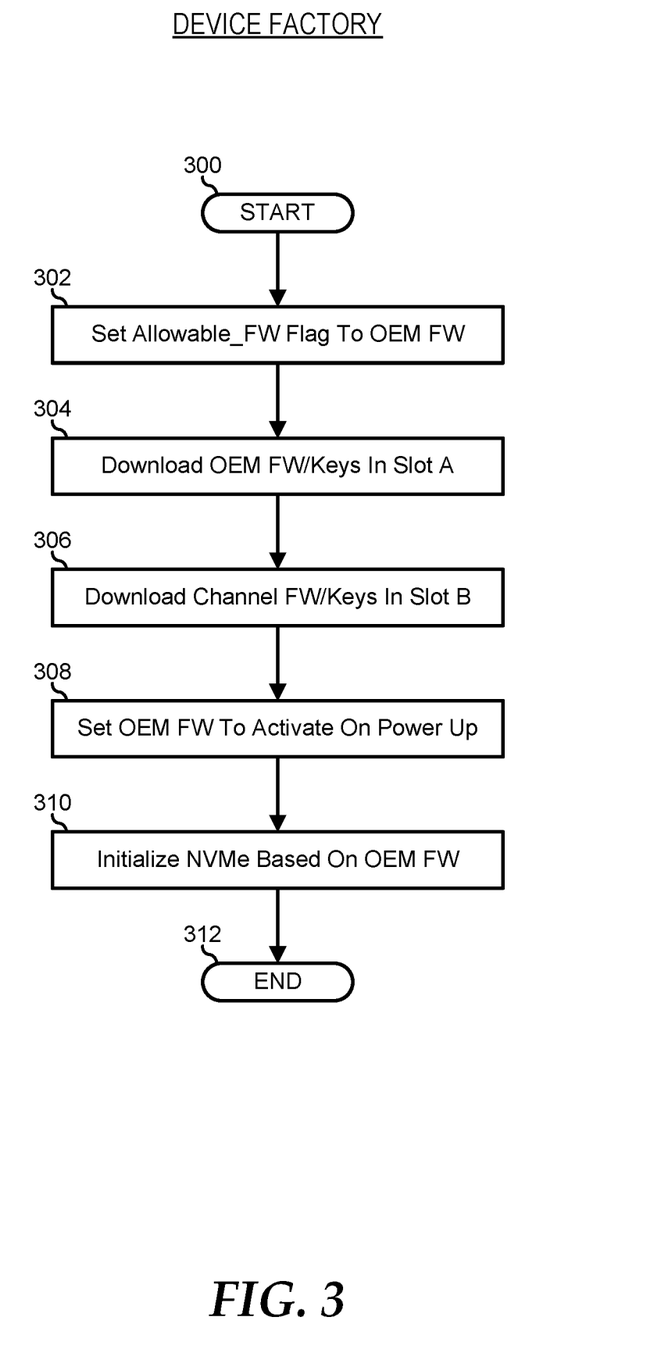
FIG. 3 is a flowchart illustrating a method for providing a single device type for multiple information handling systems according to an embodiment of the current disclosure.

FIG. 3 illustrates a method for providing a single device type for multiple information handling systems, starting at block 300. This method may be understood to be performed by the device manufacturer or some other location prior delivery to the information handling system manufacturer. Here, the device type may be understood to be a Non-Volatile Memory-Express (NVMe) device for illustrative purposes. However, it should be understood that the method may apply to other devices than NVMe devices, as needed or desired. A flag (Allowable_FW) is set to enable an OEM firmware image in a non-volatile memory of a device in step 302. An OEM firmware image and associated authentication keys are downloaded to a first firmware slot (Slot A) of the device in block 304, and a channel firmware image and associated authentication keys are downloaded to a second firmware slot (Slot B) of the device in block 306. The OEM firmware is set to activate upon power-up of the device in block 308. The NVMe features and settings for the device are initialized based upon the OEM firmware image in block 310, and the method ends in block 312.

Figure 4:
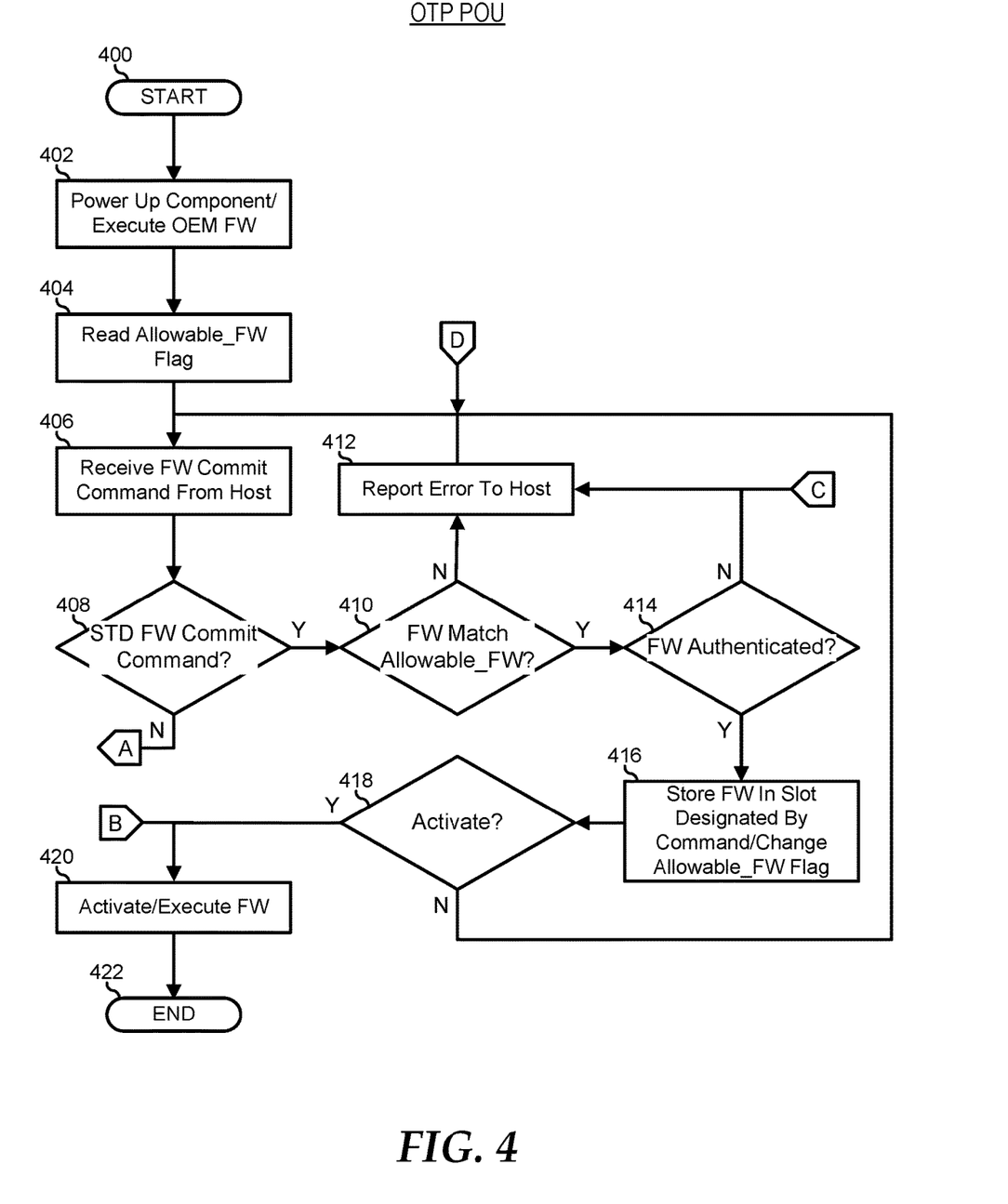
FIGS. 4 and 5 are flowcharts illustrating a method for manufacturing multiple information handling systems with a single device type according to an embodiment of the current disclosure.
Figure 5:
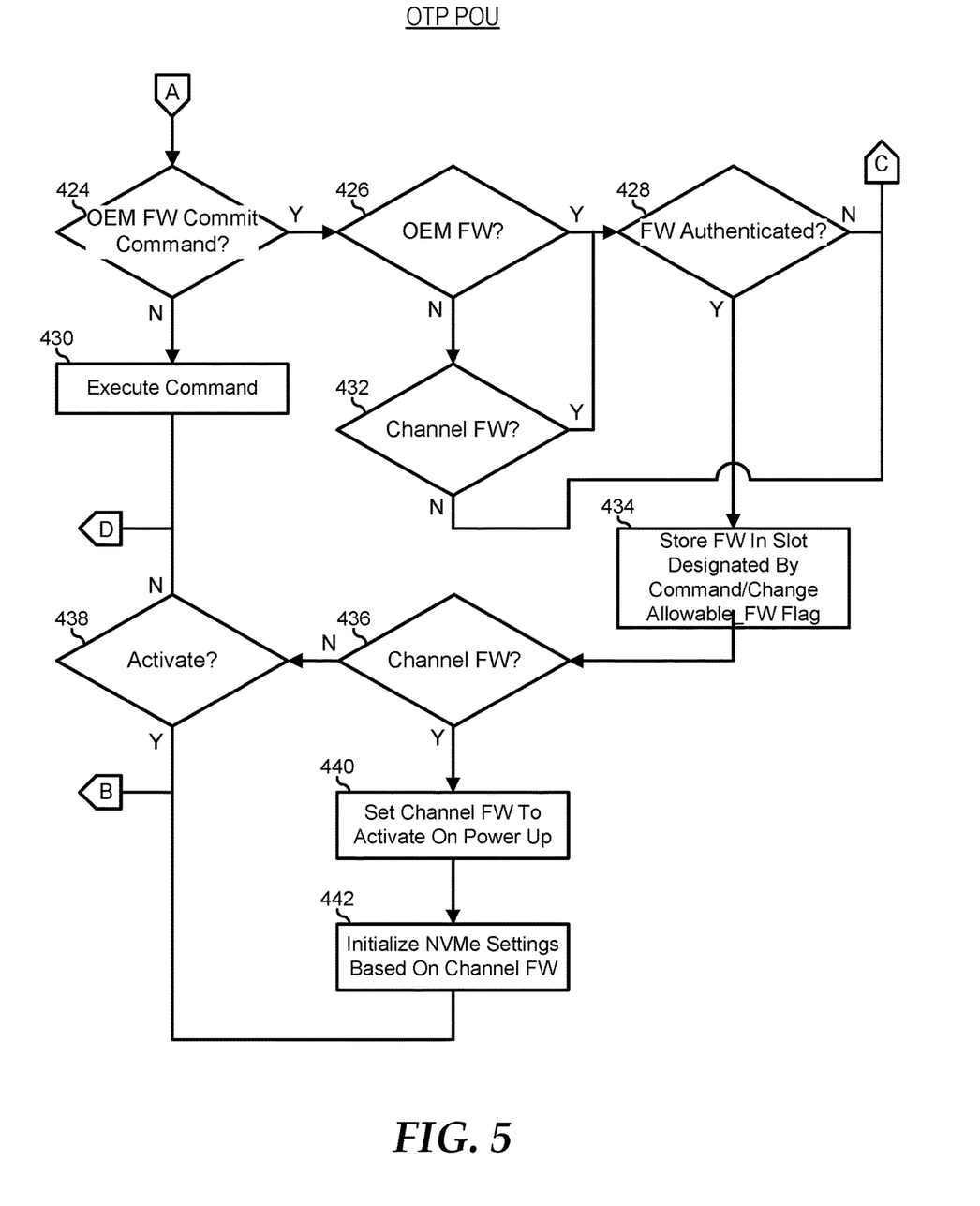

FIGS. 4 and 5 illustrate a method for manufacturing multiple information handling systems with a single device type, starting at block 400. Here, the device type may be understood to be a NVMe device for illustrative purposes. The device is powered-up and the OEM firmware execution commences in block 402. The flag (Allowable_FW) is read in block 404. A firmware commit command indicating a type of firmware image to commit to the device is received from a host system by the device in block 406. Here, the firmware commit command may be a standard firmware commit command, such as a NVMe Firmware Image Download command or a NVMe Firmware Commit command that are utilized to invoke a firmware update for the type of firmware instantiated on the device, or the firmware commit command may be an OEM firmware commit command that, when received by an OEM firmware, permits the one-time-programming of the device to change from the OEM firmware type to a different firmware type and to lock the newly designated firmware type for future operation. In a particular embodiment, the OEM firmware commit command represents the standard firmware commit commands, but with extended arguments that are only interpretable by the OEM firmware and that invoke the functions and features of the OEM firmware commit process described herein. In another embodiment, the OEM firmware commit command represents a unique command that is only interpretable by the OEM firmware. Here, it will be understood that the OEM firmware may receive other types of commands, such as read, write, and other administrative commands. In a particular embodiment, the illustrated method may include a feature that prevents the execution of any other such commands until a particular type of firmware is locked into the device as illustrated in the present embodiments. The execution of such commands are known in the art, and will not be further described herein, except as needed to illustrate the current embodiments.

A decision is made as to whether or not the firmware commit command is a standard firmware commit command in decision block 408. If so, the "YES" branch of decision block 408 is taken and a decision is made as to whether or not the firmware image in the firmware commit command matches the firmware type indicated by the flag (Allowable_FW) in decision block 410. If not, the "NO" branch of decision block 410 is taken, a firmware commit error is reported to the host in block 412, and the method returns to block 406 where a new firmware commit command is received.

If the firmware image in the firmware commit command matches the firmware type indicted by the flag (Allowable_FW), the "YES" branch of decision block 410 is taken and a decision is made as to whether or not the firmware image is authenticated in decision block 414. If not, the "NO" branch of decision block 414 is taken and the method returns to block 412 where a firmware commit error is reported to the host. If the firmware image is authenticated, the "YES" branch of decision block 414 is taken and the firmware image is stored in the firmware slot designated by the firmware commit command, and the Allowable_FW flag is set to the channel firmware in block 416. A decision is made as to whether or not the firmware commit command includes a direction to activate the firmware image in decision block 418. If not, the "NO" branch of decision block 418 is taken and the method returns to block 406 where a new firmware commit command is received. If the firmware commit command includes a direction to activate the firmware image, the "YES" branch of decision block 418 is taken, the firmware image is activated and operations proceed to execute the activated firmware image in block 420, and the method ends in block 422.

Returning to decision block 408, if the firmware commit command is not a standard firmware commit command, the "NO" branch is taken and a decision is made as to whether or not the firmware commit command is an OEM firmware commit command in decision block 424. Here, it will be understood that the ability to interpret a non-standard firmware commit command will only be available in the OEM firmware, and not in the channel firmware. If the firmware commit command is not an OEM firmware commit command, the "NO" branch of decision block 424 is taken, the command is executed in block 430, and the method returns to block 406 where a new firmware commit command is received. If the firmware commit command is an OEM firmware commit command, the "YES" branch of decision block 424 is taken and a decision is made as to whether or not the firmware image in the firmware commit command is an OEM firmware in decision block 426. If so, the "YES" branch of decision block 426 is taken as described further below. If not, the "NO" branch of decision block 426 is taken and a decision is made as to whether or not the firmware image in the firmware commit command is a channel firmware in decision block 432. If not, the "NO" branch of decision block 432 is taken and the method returns to block 412 where an error is reported to the host.

If either the firmware image in the firmware commit command is an OEM firmware, as determined in decision block 426, or the firmware image in the firmware commit command is a channel firmware, as determined in decision block 432, then, one of the "YES" branch of decision block 426 is taken or the "YES" branch of decision block 432 is taken, and a decision is made as to whether or not the associated firmware image is authenticated in decision block 428. If not, the "NO" branch of decision block 428 is taken and the method returns to block 412 where an error is reported to the host. If the associated firmware image is authenticated, the "YES" branch of decision block 428 is taken and the associated firmware image is stored in the firmware slot designated by the commit command in block 434, and a decision is made as to whether or not the associated firmware is channel firmware in decision block 436. If not, the "NO" branch of decision block 436 is taken and a decision is made as to whether or not the firmware commit command includes a direction to activate the firmware image in decision block 438. If not, the "NO" branch of decision block 438 is taken and the method returns to block 406 where a new firmware commit command is received. If the firmware commit command includes a direction to activate the firmware image, the "YES" branch of decision block 438 is taken, the firmware image is activated and operations proceed to execute the activated firmware image in block 420, and the method ends in block 422.

Returning to decision block 436, if the associated firmware is channel firmware, the "YES" branch is taken and the channel firmware is set to activate on power-up in block 440. The NVMe features and settings for the device are initialized based upon the channel firmware image, and the Allowable_FW flag is maintained at the OEM firmware in block 442, and the method returns to block 420 where the firmware image is activated and operations proceed to execute the activated firmware image, and the method ends in block 422. In a particular embodiment, an OEM firmware commit command may include an authentication string that ensures that only an OEM firmware can execute the OEM firmware commit command.

Figure 6:
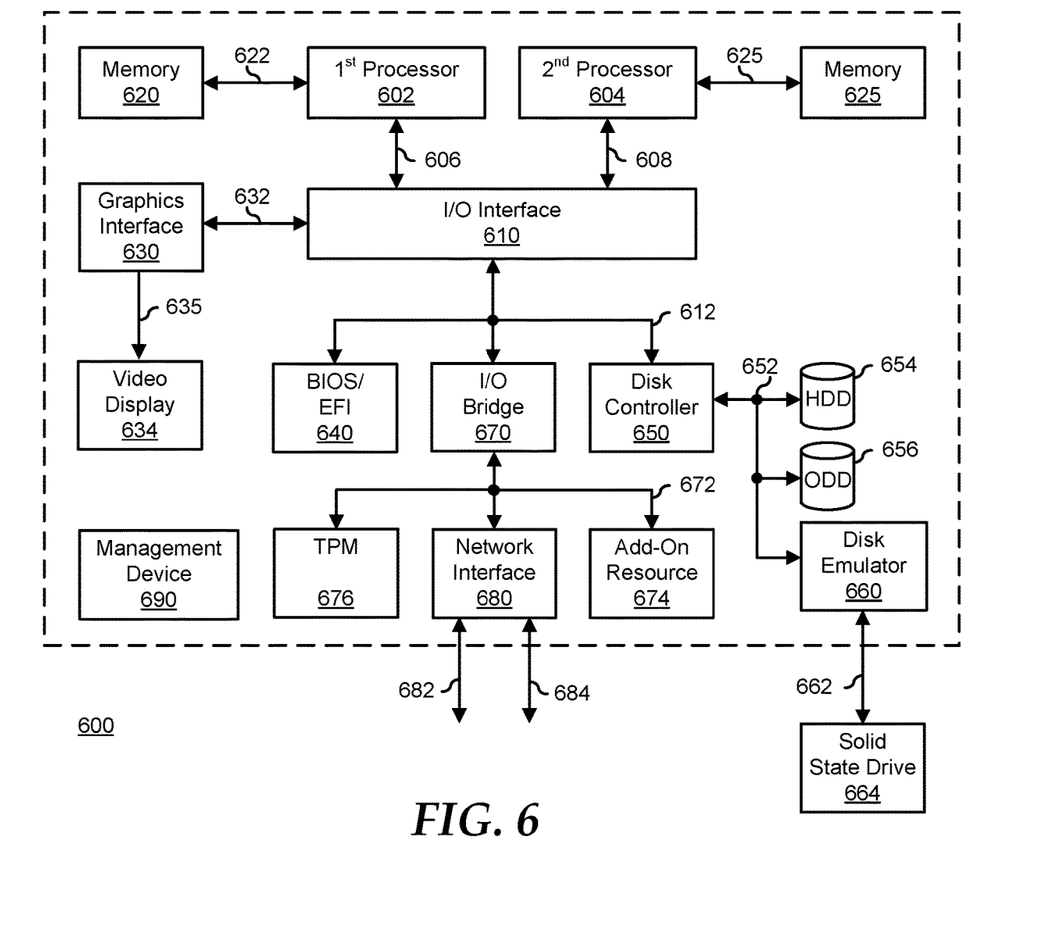
FIG. 6 is a block diagram illustrating a generalized information handling system according to another embodiment of the present disclosure.

FIG. 6 illustrates a generalized embodiment of an information handling system 600. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below, and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632, and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612, or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniB and channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600. Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A device, comprising:
a first storage location storing a first firmware of a first type, the first firmware to configure the device to be installed into a first information handling system associated with the first type; and
a second storage location storing a second firmware of a second type different from the first type, the second firmware to configure the device to be installed into a second information handling system associated with the second type;
wherein the device is configured to:
receive a first firmware commit command;
determine that the first firmware commit command includes one of a first indication to commit the first firmware, and a second indication to commit the second firmware, but not both the first indication and the second indication;
when the first firmware commit command includes the first indication, lock the device to use the first firmware and not the second firmware and to prevent the device from updating the first firmware with a first firmware update unless the first firmware update is associated with the first type; and
when the first firmware commit command includes the second indication, lock the device to use the second firmware and not the first firmware and to prevent the device from updating the second firmware with a second firmware update unless the second firmware update is associated with the second type.

2. The device of claim 1, wherein the device is further configured to:
determine that the first firmware commit command includes a third indication to commit a third firmware of a third type, the third firmware to configure the device to be installed into a third information handling system associated with the third type;
determine that the first firmware commit command includes the third indication;
retrieve the third firmware when the first firmware commit command includes the third indication;
store the third firmware on the device; and
lock the device to use the third firmware and not the first firmware or the second firmware and to prevent the device from updating the third firmware with a third firmware update unless the third firmware update is associated with the third type.

3. The device of claim 1, wherein the first firmware includes a first key, and the second firmware includes a second key.

4. The device of claim 3, wherein:
prior to locking the device to use the first firmware, the device is further configured to validate the first firmware based on the first key; and
prior to locking the device to use the second firmware, the device is further configured to validate the second firmware based on the second key.

5. The device of claim 1, wherein, after locking the device to use the first firmware, the device is further configured to:
receive a second firmware commit command, the second firmware commit command including the second indication to commit the second firmware.

6. The device of claim 5, wherein the device is further configured to send an error indication in response to receiving the second firmware commit command.

7. The device of claim 1, wherein, after locking the device to use the first firmware, the device is further configured to:
receive a second firmware commit command including a third indication to commit third firmware of the first type.

8. The device of claim 7, wherein, after receiving the second firmware commit command, the device is further configured to:
determine that the second firmware commit command includes the third indication;

retrieve the third firmware when the third firmware commit command includes the third indication; and
store the third firmware on the device.

9. The device of claim 1, wherein the device includes at least one of a memory storage device, a network device, a storage controller, a co-processor device, a programmable array device, an audio device, and a management device.

10. A method, comprising:
providing, on a device, first firmware of a first type stored in a first location of the device, the first firmware to configure the device to be installed into a first information handling system associated with the first type; and
providing, on the device, second firmware of a second type different from the first type stored in a second location of the device, the second firmware to configure the device to be installed into a second information handling system associated with the second type;
receiving, by the device, a first firmware commit command;
determining, by the device, that the firmware commit command includes one of a first indication to commit the first firmware, and a second indication to commit the second firmware, but not both the first indication and the second indication;
when the first firmware commit command includes the first indication, locking the device to use the first firmware and not the second firmware and to prevent the device from updating the first firmware with a first firmware update unless the first firmware update is associated with the first type; and
when the first firmware commit command includes the second indication, locking the device to use the second firmware and not the first firmware and to prevent the device from updating the second firmware with a second firmware update unless the second firmware update is associated with the second type.

11. The method of claim 10, wherein the method further comprises:
determining, by the device, that the first firmware commit command includes a third indication to commit a third firmware of a third type, the third firmware configured to be installed into a third information handling system associated with the third type;
determining that the first firmware commit command includes the third indication;
retrieving the third firmware when the first firmware commit command includes the third indication;
storing the third firmware on the device; and
locking the device to use the third firmware and not the first firmware or the second firmware and to prevent the device from updating the third firmware with a third firmware update unless the third firmware update is associated with the third type.

12. The method of claim 11, wherein the first firmware includes a first key, and the second firmware includes a second key.

13. The device of claim 12, wherein:
prior to locking the device to use the first firmware, the method further comprises validating the first firmware based on the first key; and
prior to locking the device to use the second firmware, the method further comprises validating the second firmware based on the second key.

14. The method of claim 11, wherein, after locking the device to use the first firmware, the method further comprises:
receiving a second firmware commit command, the second firmware commit command including the second indication to commit the second firmware.

15. The method of claim 14, further comprising:
sending an error indication in response to receiving the second firmware commit command.

16. The method of claim 11, wherein, after locking the device to use the first firmware, the method further comprises:
receiving a second firmware commit command including a third indication to commit third firmware of the first type.

17. The method of claim 16, wherein, after receiving the second firmware commit command, the method further comprises:
determining that the second firmware commit command includes the third indication;
retrieving the third firmware when the third firmware commit command includes the third indication; and
storing the third firmware on the device.

18. The method of claim 11, wherein the device includes at least one of a memory storage device, a network device, a storage controller, a co-processor device, a programmable array device, an audio device, and a management device.

19. An information handling system, comprising:
a processor; and
a device including:
a first storage location storing a first firmware to configure the information handling system to operate as a first type of information handling system; and
a second storage location storing a second firmware to configure the information handling system operate as a second type of information handling system;
wherein the information handling system is configured to provide a first firmware commit command, the first firmware commit command including one of a first indication to commit the first firmware, and a second indication to commit the second firmware, but not both the first indication and the second indication; and
wherein the device is configured to:
receive the first firmware commit command;
when the first firmware commit command includes the first indication, lock the device to use the first firmware and not the second firmware and to prevent the device from updating the first firmware with a first firmware update unless the first firmware update is associated with the first type; and
when the first firmware commit command includes the second indication, lock the device to use the second firmware and not the first firmware and to prevent the device from updating the second firmware with a second firmware update unless the second firmware update is associated with the second type.

20. The information handling system of claim 19, wherein, after locking the device to use the first firmware:
the processor is further configured to provide a second firmware commit command, the second firmware commit command including the second indication to commit the second firmware; and
the device is further configured to receive the second firmware commit command, and to send an error indication in response to receiving the second firmware commit command.

* * * * *